(12) United States Patent
Fisch

(10) Patent No.: US 10,384,840 B2
(45) Date of Patent: Aug. 20, 2019

(54) SHAKER TOP WITH FRESHNESS SEAL AND METHOD OF MAKING SAME

(71) Applicant: Performance Systematix, Inc., Grand Rapids, MI (US)

(72) Inventor: Adam Jeffery Fisch, Dorr, MI (US)

(73) Assignee: Performance Systematix, Inc., Grand Rapids, MI (US)

( * ) Notice: Subject to any disclaimer, the term of this patent is extended or adjusted under 35 U.S.C. 154(b) by 0 days.

(21) Appl. No.: 15/853,292

(22) Filed: Dec. 22, 2017

(65) Prior Publication Data

US 2018/0118425 A1 May 3, 2018

Related U.S. Application Data

(63) Continuation-in-part of application No. 15/204,014, filed on Jul. 7, 2016.
(Continued)

(51) Int. Cl.
*B65D 47/18* (2006.01)
*B65D 51/18* (2006.01)
(Continued)

(52) U.S. Cl.
CPC .......... *B65D 47/185* (2013.01); *B65D 51/18* (2013.01); *B65D 51/185* (2013.01); *B65D 51/20* (2013.01); *B65D 83/06* (2013.01); *B29C 65/02* (2013.01); *B29C 65/18* (2013.01); *B29C 65/3656* (2013.01); *B29C 65/4825* (2013.01); *B29C 66/112* (2013.01); *B29C 66/1122* (2013.01);
(Continued)

(58) Field of Classification Search
CPC .... B65D 47/185; B65D 51/18; B65D 51/185; B65D 51/20; B65D 83/06; B65D 2251/0025; B65D 2251/0059; B65D 2251/0062; B29C 65/02; B29C 65/3656; B29C 65/4825; B29C 66/112; B29C 66/1122; B29C 66/131; B29C 66/472; B29C 66/53461; B29C 66/71; B29C 66/72326; B29C 66/72328; B29C 66/7392; B29C 66/73921; B29C 66/72321; B29C 66/72300; B29K 2023/065; B29K 2023/06; B29K 2067/00
See application file for complete search history.

(56) References Cited

U.S. PATENT DOCUMENTS 3,682,366 A 8/1972 Chung
4,020,969 A 5/1977 Ando
(Continued)

*Primary Examiner* — Frederick N Nicolas
(74) *Attorney, Agent, or Firm* — Kohn and Associates, PLLC

(57) ABSTRACT

A shaker top for dispensing products in a container, including a top unit having a peelable protective cover affixed by heat staking upon a dispensing liner having at least one perforation, the top unit affixed to a mouth of a container. A method of manufacturing a shaker top with a peelable protective cover, including the steps of affixing a peelable protective cover upon a dispensing liner by heat staking, assembling a top unit including the peelable protective cover and the dispensing liner, affixing the top unit to a mouth of a container, and covering the container with a cap. A shaker top with a peelable protective cover attached to a container, manufactured by the method of manufacture. A method of using a container having a shaker top with a freshness seal.

8 Claims, 3 Drawing Sheets

Related U.S. Application Data

(60) Provisional application No. 62/190,439, filed on Jul. 9, 2015.

(51) Int. Cl.
*B65D 51/20* (2006.01)
*B65D 83/06* (2006.01)
*B29C 65/18* (2006.01)
*B29C 65/00* (2006.01)
*B29C 65/36* (2006.01)
*B29C 65/48* (2006.01)
*B29C 65/02* (2006.01)

(52) U.S. Cl.
CPC ......... *B29C 66/131* (2013.01); *B29C 66/472* (2013.01); *B29C 66/53461* (2013.01); *B29C 66/71* (2013.01); *B29C 66/72321* (2013.01); *B29C 66/72326* (2013.01); *B29C 66/72328* (2013.01); *B29C 66/7392* (2013.01); *B29C 66/73921* (2013.01); *B65D 2251/0025* (2013.01); *B65D 2251/0059* (2013.01); *B65D 2251/0062* (2013.01)

(56) References Cited

U.S. PATENT DOCUMENTS

| | | |
|---|---|---|
| 4,445,620 A | 5/1984 | Brochman |
| 4,564,121 A | 1/1986 | Brochman |
| 4,595,114 A | 6/1986 | Lu |
| 4,771,937 A | 9/1988 | Kamada |
| 4,960,216 A | 10/1990 | Giles |
| 5,004,111 A | 4/1991 | McCarthy |
| 5,077,050 A | 12/1991 | Wall |
| 5,125,529 A | 6/1992 | Torterotot |
| 5,197,618 A | 3/1993 | Goth |
| 5,265,745 A | 11/1993 | Pereyra |
| 5,513,781 A | 5/1996 | Ulrich |
| 7,798,359 B1 | 9/2010 | Marsella |
| 7,882,991 B2 * | 2/2011 | Schechter ............ B65D 25/04 220/253 |
| 2009/0057326 A1 * | 3/2009 | Opitz .................. A45D 33/025 220/789 |
| 2016/0046414 A1 | 2/2016 | Grell |
| 2016/0046422 A1 | 2/2016 | Grell |
| 2017/0007051 A1 | 1/2017 | Fisch |

\* cited by examiner

SHAKER TOP WITH FRESHNESS SEAL AND METHOD OF MAKING SAME

BACKGROUND OF THE INVENTION

1. Technical Field

The invention relates to dispensing liners and protective seals for jars and other containers, and to methods for making such dispensing liners and protective seals.

2. Background Art

Containers with shaker tops are useful for storing and dispensing powders, flakes, and other particulate contents, such as spices and seasonings. A typical shaker top includes a dispensing liner that extends across the open mouth of a container such as a wide-necked jar. The dispensing liner contains at least one perforation, which is of a size that permits the controlled release of contents from the container, by actions such as shaking and sifting. To prevent spoilage and loss of contents during shipping and storage, the dispensing liner is usually sealed with a peelable protective cover, also known as a "freshness seal", which occludes the perforations of the dispensing liner. The protective cover is affixed to the dispensing liner with an adhesive weak enough to permit its removal by a user, prior to dispensing the contents from the container.

A typical shaker top is disclosed by U.S. Pat. No. 5,513,781, to Ullrich, et al. ("Ullrich"). The shaker top includes a dispensing liner in the form of a perforated sifter. The sifter extends across the mouth of a bottle. A protective cover, in the form of a peel-away liner, is sealed over the top surface of the sifter, to cover at least the perforations of the sifter. The sifter preferably includes a metallic foil such as aluminum foil, because such foils can be induction sealed to the mouth of the bottle. In induction sealing, an adhesive layer, such as a heat sealable polymer film, is laminated to a metal foil. The laminate is then exposed to an induction coil emitting an oscillating electromagnetic field. Induced current in the foil melts the polymer film, which flows into the gap between the foil and a substrate, such as the mouth of a bottle. When cooled, the polymer film forms an adhesive bond between the foil and the substrate. In the shaker top of Ullrich, both the sifter and the peel-away liner include heat sealable adhesive layers. A closure cap, such as a threaded screw-on cap, protects the entire shaker top assembly.

A container top disclosed by U.S. Patent Application Publication No. 2003/0168423, to Williams, is designed for dispensing of liquids. It includes an induction sealed barrier film with a pour spout, rather than a sifter top, but is otherwise similar to the shaker top disclosed by Ullrich.

Ullrich also discloses a typical method for manufacturing a bottle having a shaker top. The sifter, peel-away liner, and their adhesive layers, are assembled into a package, which is mounted within a specialized retaining area within the closure cap. The mounting of the package in the retaining area is mediated by a friction fit, or by an adhesive. The package and closure cap are stored or transported as a unit, with the elements of the package being held in alignment by confinement within the retaining area of the closure cap. The package and closure cap are then mounted upon the neck of a bottle or other container, and subjected to induction bonding. The sifter is sealed across the neck of the bottle, and the peel-away liner is sealed to the sifter, beneath the closure cap.

The method of Ullrich is efficient, but it imposes restrictions upon the sizes and compositions of the sifter and protective liner, and upon the structure of the closure cap. For example, a protective liner that is smaller in diameter than the sifter may be desirable, but cannot be used with the Ullrich method. A protective liner smaller than the diameter of the sifter will not be securely confined within a closure cap whose retaining area accommodates the wider sifter. The protective liner is therefore likely to slip out of alignment with the perforations in the sifter during shipping and handling of the package-closure cap unit. The choice of closure caps is also restricted. Well known, off-the-shelf closure caps cannot be used with the Ullrich method, for they lack a retaining area to keep the package in proper alignment.

There is a need for a method for manufacturing shaker tops without preassembling components into a package prior to mounting upon a container. There is also a need for the diverse assortment of shaker tops that can be produced by such a method of manufacture.

SUMMARY OF THE INVENTION

The present invention provides for a shaker top for dispensing products in a container, including a top unit having a peelable protective cover affixed by heat staking upon a dispensing liner having at least one perforation, the top unit affixed to a mouth of a container.

The present invention provides for a method of manufacturing a shaker top with a peelable protective cover, including the steps of affixing a peelable protective cover upon a dispensing liner by heat staking, assembling a top unit including the peelable protective cover and the dispensing liner, affixing the top unit to a mouth of a container, and covering the container with a cap.

The present invention further provides for a shaker top with a peelable protective cover attached to a container, manufactured by the above method of manufacture.

The present invention also provides for a method of using a container having a shaker top with a freshness seal, by removing a cap from a mouth of a container, removing a peelable protective seal from a dispensing liner affixed the mouth, the dispensing liner including at least one dispensing perforation, and releasing contents of the container through the at least one dispensing perforation.

BRIEF DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

Figure 1:
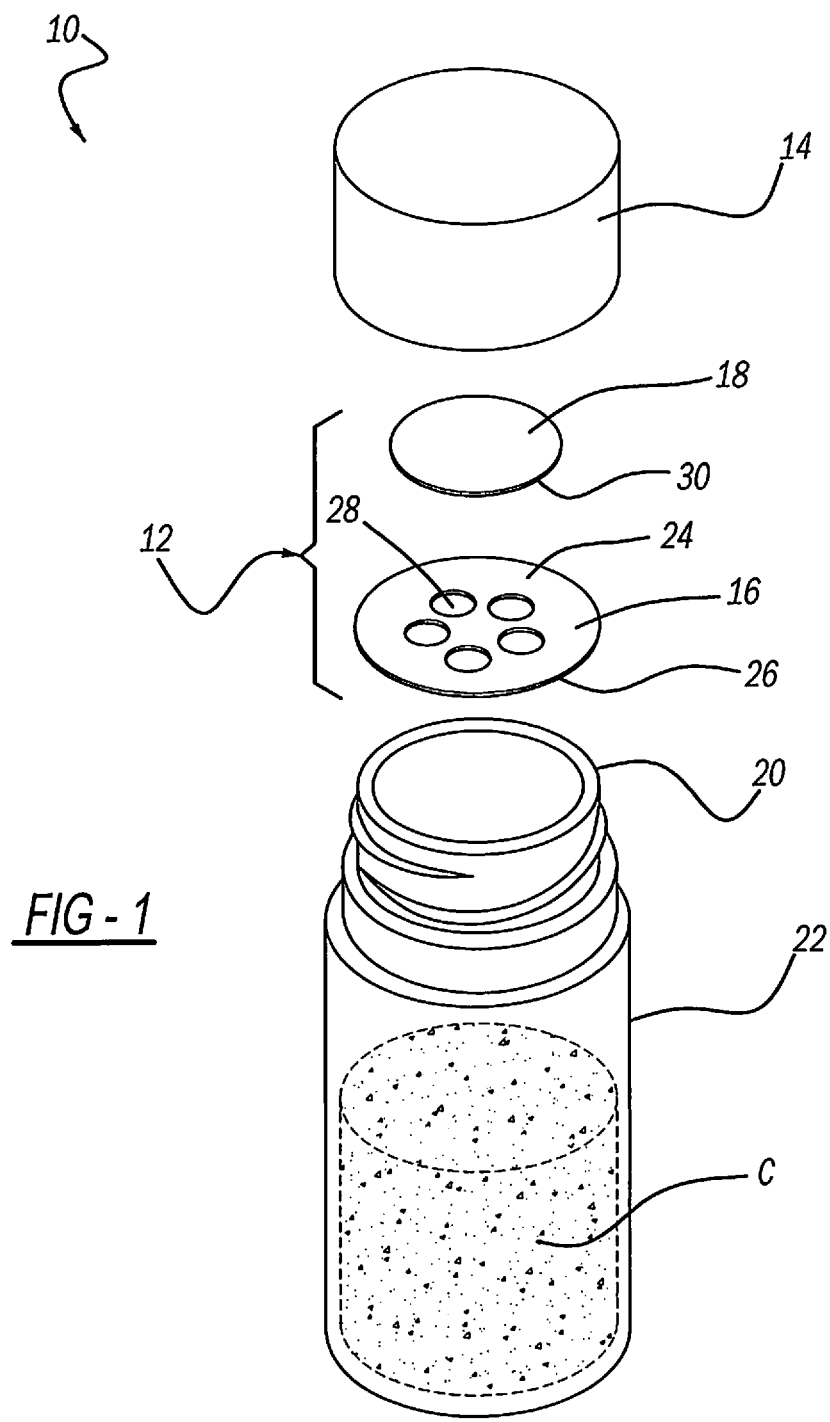
FIG. 1 shows an exploded view of a container including a shaker top according to the present invention.

The present invention generally provides for shaker top containers and methods of manufacturing the shaker top containers. A shaker top according to the present invention, generally shown at 10 in the FIGURES, includes a top unit 12 and a cap 14. The top unit 12 includes a dispensing liner 16 and a protective cover 18, which acts as a peelable freshness seal (therefore it is a peelable protective cover 18). The top unit 12 is affixable to the mouth 20 of a container 22, which holds the contents C to be dispensed. The protective cover 18 limits the spoilage-accelerating effects of atmospheric air, retains volatile flavorings and scents of the container contents, and serves as a tamper-indicating seal.

The dispensing liner 16 and the protective cover 18 preferably are made of a foil, such as aluminum foil, or a foil laminate. The advantage of foil-containing materials is their compatibility with induction heating sealing processes as well as heat staking processes. A foil laminate can additionally include layers of plastic, paper, cardboard, or foam, among other suitable materials (not shown).

Figure 3A:
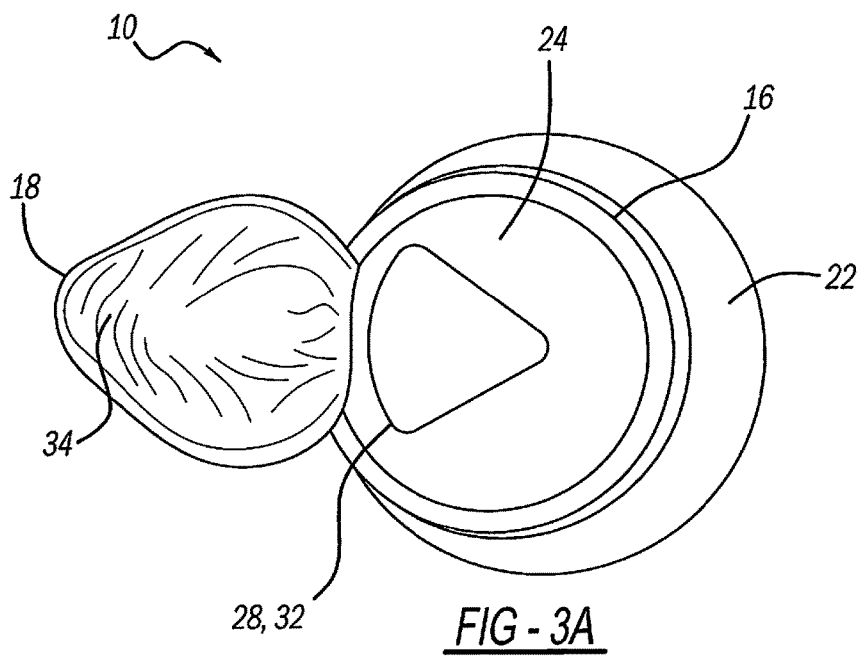
FIG. 3A shows a top view of a shaker top with a dispensing perforation in a triangular shape with a protective cover peeled back.

The dispensing liner 16 includes an upper liner surface 24, a lower liner surface 26, and at least one dispensing perforation 28 defined therethrough. Preferably, a plurality of dispensing perforations 28 are provided, with the number and diameter of the dispensing perforations 28 being determined by the nature of the contents C of the container 22. For example, several small perforations can be desired if the contents C are spices or powders to be shaken out of the container 20. The dispensing perforations 28 can also be in any suitable shape for dispensing a product, such as, but not limited to, triangular, oval, square, or circular. In FIG. 3A, the single dispensing perforation 28 is in a triangular shape 32. This particular shape can be preferred for dispensing pills or capsules. The shape and size of the dispensing perforation 28 can be determined by the shape and amount of pills or capsules that are preferred to be dispensed from the container 20 at a time. For example, this can be useful in limiting the amount of pills or capsules that are dispensed with medications that people commonly take too much of. One skilled in the art can readily determine an appropriate number and diameter of perforations 28 to enable a user to dispense a specific type of contents at a satisfactory rate of flow, while maintaining a satisfactory degree of control. The dispensing perforations 28 can thus be designed to allow for a controlled dispensing of the contents C, whether they are a food product or medicine.

The container 22 can include any plastic or glass container known in the art. Preferred materials include polyethylene (PE), high density polyethylene (HDPE), a polyester such as polyethylene terephthalate (PET), polyvinyl chloride (PVC), and glass.

The top unit 12 is affixed to the container 22, with the lower liner surface 26 of the dispensing liner 16 in contact with the mouth 20 of the container 22. The lower liner surface 26 is preferably affixed to the mouth 20 by a permanent bond, to prevent dislodgment of the dispensing liner 16 during use. Preferably, affixation of the dispensing liner 16 is performed by induction sealing with a heat sealable film, such as a polyester or polyethylene film, situated on at least the periphery of the lower liner surface 26. The preferred material for the dispensing liner 16 is a metallic foil, such as an aluminum foil, or a foil laminate. Dispensing perforations 28 are readily machined into these materials, for example by hole punching. Heat sealable foils pre-coated with a layer of heat sealable film are well known in the art, and can be readily matched for adhesive compatibility with the specific material of which the container is composed. For example, for an HDPE or PE container, the Selig FS 3-19 induction foil seal is a suitable material for a dispensing liner 16 (Selig Sealing Products, Inc., Naperville, Ill.). In a less preferred alternative, a pressure sensitive adhesive can be employed, in lieu of a heat sealable adhesive.

The protective cover 18 is affixed to the upper liner surface 24 of the dispensing liner 16, preferably in a concentric position relative to the dispensing liner 16. The protective cover 18 is preferably affixed to the dispensing liner 16 by heat staking. This allows for the melt layers of the two foil materials used for the protective cover 18 and the dispensing liner 16 to be bonded together by heat produced by a heating implement (such as heated metal probes). The protective cover 18 is preferably affixed with a less aggressive seal than that created between the dispensing liner 16 and the container 22, so that the protective cover 18 can be easily peeled away by a user. Heat sealable films can be included, such as a polyolefin film. The heat sealable film can be situated on the upper liner surface 24 of the dispensing liner 16, or on the lower cover surface 30 of the protective cover 18, or on both of these surfaces. Alternatively, heat induction can be used for affixation. An exemplary pre-coated induction foil suitable for inclusion in the protective cover 18 is the Selig FS 3-22 induction foil seal. In a less preferred alternative, a pressure sensitive adhesive can be employed, in lieu of a heat sealable adhesive.

The cap 14 can include any suitable container closure, such as, but not limited to, a snap-on cap and a screw-on cap. A suitable material for the cap 14 includes, but is not limited to, polypropylene or polyethylene.

Figure 2:
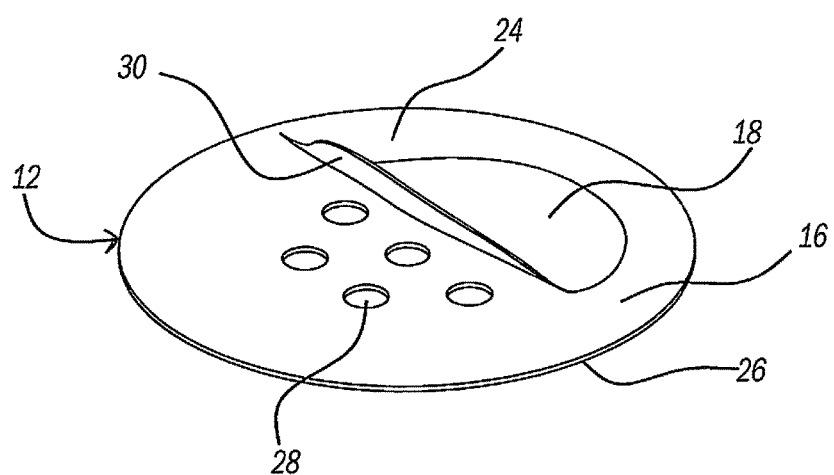
FIG. 2 shows a perspective view of a top unit of the shaker top, including a dispensing liner and a protective cover.
Figure 3B:
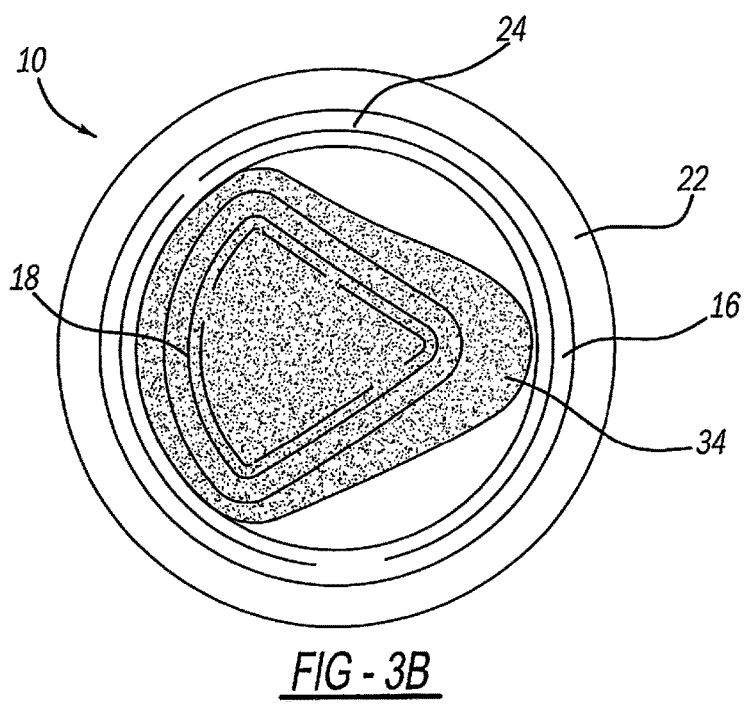
FIG. 3B shows a top view of the same shaker top with the protective cover attached.

In a preferred embodiment, the diameter of the protective cover 18 is less than the diameter of the dispensing liner 16, as shown in FIG. 2. That is, the protective cover 18 occludes all of the dispensing perforations 28 but does not extend completely to the edges of the dispensing liner 16. The protective cover 18 can also generally be the shape of the dispensing perforation 28 but slightly larger to cover it, such as in a triangular shape to cover the triangular shaped dispensing perforation 28 in FIGS. 3A and 3B. This configuration economizes on materials used for the protective cover 18. The configuration is made possible by the method of manufacture provided by the present invention. The protective cover 18 can further include a lip 34, as in FIGS. 3A and 3B to aid in peeling back the protective cover 18 from the dispensing liner 16. The lip 34 can be in any suitable shape and size and it itself is not sealed to the dispensing liner 16 so that it can be grabbed by the fingertips of a user.

In a method of manufacturing the shaker top 10 of the present invention, the protective cover 18 is positioned atop the dispensing liner 16, with the lower cover surface 30 of the protective cover 18 in contact with the upper liner surface 24 of the dispensing liner 16. The dispensing liner 16 and the protective cover 18 are then combined by affixing the protective cover 18 to the dispensing liner 16 by heat staking. In the preferred embodiment, the dispensing liner 16 and the protective cover 18 include a metallic foil or foil laminate and a heat sealable adhesive. Alternatively, and less desirably, the dispensing liner 16 and/or the protective cover 18 include a layer of pressure sensitive adhesive (not shown), and the affixation step is performed by exerting pressure upon the dispensing liner 16 and the protective cover 18. In this case, the inclusion of a foil in the dispensing liner 16 or the protective cover 18 is optional. In either case, the dispensing liner 16 and the protective cover 18 are assembled to form the top unit 12. The top unit 12 is then positioned upon the mouth 20 of the container 22, with the lower liner surface 26 of the dispensing liner 16 in contact with the mouth 20. The top unit 12 is then affixed to the mouth 20 of the container 22, a step which can be performed by heat staking, induction heating, or, less desirably, by compressing a pressure sensitive adhesive, as previously described. Finally, a cap 14 is applied to the mouth 20 of the container 22. The cap 14 is situated so as to enclose and protect the top unit 12.

Thus, the present invention provides a method of manufacturing a container with a shaker top 10, including the steps of: positioning a protective cover 18 upon a dispensing liner 16, affixing the protective cover 18 to the dispensing liner 16, assembling a top unit 12; positioning the top unit 12 upon a mouth 20 of a container, affixing the top unit 12 to the mouth 20 of the container, and applying a cap 14 to the mouth 20 of the container 22.

In an alternative variation of the method, which is also within the scope of the present invention, the step of assembling the top unit 12 is performed in situ, upon the mouth 20 of the container 22. That is, the dispensing liner 16 is applied to, and affixed to, the mouth 20 of the container 22; and, subsequently, the protective cover 18 is applied to, and affixed to, the dispensing liner 16.

The present method of manufacture avoids the restraints required by the method of Ullrich. That is, there is no need to position the dispensing liner 16 and protective cover 18 within a retaining space defined within the cap 14; there is no need for the protective cover 18 to have the same diameter as the dispensing liner 16, to prevent it from slipping out of alignment, within the retaining space; and no need to limit the cap 14 to those including a restraining space. The present invention thereby provides greater flexibility in the dimensions and choice of the materials of the shaker top 10 than do shaker tops of the prior art.

The present invention also provides a container 22 having a shaker top 10, with the shaker top 10 being manufactured and affixed to the container 22 through the method previously described.

Also provided by the present invention is a method of using a shaker top with a freshness seal. The method includes the steps of: removing a cap 14 from the mouth 20 of a container 22, the cap lacking a retaining space (not shown); removing a protective seal 18 from a dispensing liner 16 affixed to the mouth, the protective seal 18 having a diameter smaller than that of the dispensing liner 16; and releasing the contents C of the container 22 through dispensing perforations 28 defined through the dispensing liner 16.

Throughout this application, various publications, including United States patents and patent applications are referenced by number. The disclosures of these patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation. Obviously, many modifications and variations of the present invention are possible in light of the above teachings. It is, therefore, to be understood that within the scope of the appended claims, the invention can be practiced otherwise than as specifically described.

What is claimed is:

1. A shaker top for dispensing products in a container, consisting of a top unit including a peelable protective cover affixed by heat staking upon a dispensing liner having at least one perforation, said top unit affixed to a mouth of a container, wherein said peelable protective cover and said dispensing liner are made of a foil material and wherein a lower liner surface of said dispensing liner is affixed to said mouth of said container by a permanent bond.

2. The shaker top of claim 1, wherein said at least one perforation is in a triangular shape.

3. The shaker top of claim 1, wherein said container is made of a material chosen from the group consisting of plastic and glass.

4. The shaker top of claim 1, wherein said permanent bond is an induction seal.

5. The shaker top of claim 1, wherein said peelable protective cover has a diameter less than a diameter of said dispensing liner.

6. The shaker top of claim 5, wherein said peelable protective cover is the shape of said dispensing perforation.

7. The shaker top of claim 1, wherein said peelable protective cover includes a lip that is not sealed to said dispensing liner.

8. The shaker top of claim 1, further including a cap chosen from the group consisting of a snap-on cap and a screw-on cap.

* * * * *